(12) United States Patent
Cereda

(10) Patent No.: US 11,416,882 B2
(45) Date of Patent: Aug. 16, 2022

(54) COMPUTER-IMPLEMENTED METHOD FOR CALCULATING A REFERENCE SALES PRICE FOR A COMPLEX INDUSTRIAL PRODUCT TO BE MANUFACTURED AT INDUSTRIAL LEVEL

(71) Applicant: ABB Schweiz AG, Baden (CH)

(72) Inventor: Carlo Cereda, Caravaggio (IT)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/903,492

(22) Filed: Jun. 17, 2020

(65) Prior Publication Data
US 2020/0402088 A1 Dec. 24, 2020

(30) Foreign Application Priority Data
Jun. 19, 2019 (EP) .................................. 19181365

(51) Int. Cl.
G06Q 10/00 (2012.01)
G06Q 30/02 (2012.01)
G06F 16/22 (2019.01)
G06Q 50/04 (2012.01)

(52) U.S. Cl.
CPC ......... *G06Q 30/0206* (2013.01); *G06F 16/22* (2019.01); *G06Q 50/04* (2013.01)

(58) Field of Classification Search
None
See application file for complete search history.

(56) References Cited

U.S. PATENT DOCUMENTS

| | | | | |
|---|---|---|---|---|
| 6,003,012 A | * | 12/1999 | Nick ..................... | G06Q 30/06 705/7.29 |
| 7,596,473 B2 | * | 9/2009 | Hansen ................. | G06Q 10/06 446/85 |
| 8,024,241 B2 | * | 9/2011 | Bailey ................... | G06Q 30/0206 705/37 |
| 2003/0130975 A1 | * | 7/2003 | Muller ................... | G06Q 10/06 706/50 |
| 2008/0270221 A1 | * | 10/2008 | Clemens ............... | G06Q 10/06375 705/7.33 |
| 2012/0035985 A1 | * | 2/2012 | Flinn .................... | G06Q 10/0631 705/7.35 |

(Continued)

OTHER PUBLICATIONS

Roper, Stephen, The roles and effectiveness of design in new product development: A study of Irish manufacturers, Nov. 6, 2015, ElSevier, https://www.sciencedirect.com/science/article/pii/S0048733315001560, p. 1-18. (Year: 2015).*

(Continued)

*Primary Examiner* — Joseph M Waesco
(74) *Attorney, Agent, or Firm* — Armstrong Teasdale LLP

(57) ABSTRACT

The application relates to a computer-implemented method for calculating a reference sales price for industrial product, in particular a complex industrial product, to be manufactured at industrial level. The method of the present invention is particularly suitable for being implemented in the context of the design activities of an industrial product to be manufactured, in particular once the industrial product to be manufactured has been configured according to the technical specifications provided by a client.

17 Claims, 6 Drawing Sheets

Figure 1:
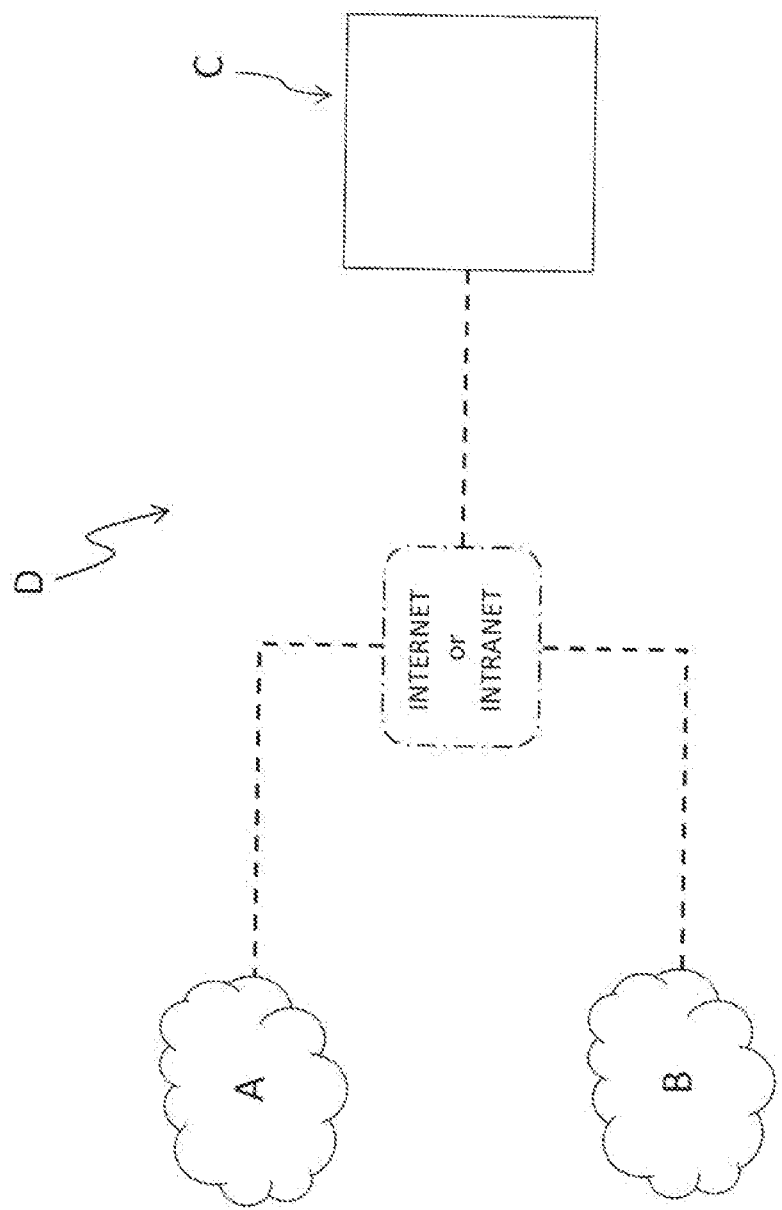

| Product Code | Country | Line Voltage (kV) | LP$_{old}$ (EUR) | NP$_{old}$ (EUR) | PF$_{old}$ (%) |
|---|---|---|---|---|---|
| 0001 | China | 50kV | 120000 | 100000 | 83,33 |
| 0002 | India | 50kV | 300000 | 200000 | 66,67 |
| 0003 | USA | 30kV | 280000 | 300000 | 107,14 |
| 0004 | China | 30kV | 270000 | 250000 | 92,59 |
| 0005 | China | 50kV | 300000 | 240000 | 80,00 |
| 0006 | China | 20kV | 300000 | 270000 | 90,00 |

(56) References Cited

U.S. PATENT DOCUMENTS

| | | | |
|---|---|---|---|
| 2013/0253988 A1* | 9/2013 | Higbie | G06Q 30/0206 |
| | | | 705/7.35 |
| 2013/0346150 A1* | 12/2013 | Beddo | G06Q 10/04 |
| | | | 705/7.31 |
| 2014/0222519 A1* | 8/2014 | Swinson | G06Q 30/0206 |
| | | | 705/7.35 |
| 2015/0220953 A1* | 8/2015 | Hagiwara | G06F 3/04842 |
| | | | 705/7.34 |
| 2016/0092892 A1* | 3/2016 | Rothschild | G06Q 10/0637 |
| | | | 705/7.29 |
| 2017/0076295 A1* | 3/2017 | Vasudev | G06Q 30/016 |
| 2017/0103471 A1* | 4/2017 | Kemp | G06F 16/23 |
| 2018/0005302 A1* | 1/2018 | Ouimet | G06Q 30/02 |
| 2021/0224868 A1* | 7/2021 | Hartman | G06Q 30/0278 |
| 2022/0100179 A1* | 3/2022 | Amano | G05B 19/4184 |

OTHER PUBLICATIONS

European Patent Office, Extended Search Report issued in corresponding Application No. 19181365.8, dated Sep. 10, 2019, 9 pp.

* cited by examiner

| Product Code | Country | Line Voltage (kV) | LPold (EUR) | NPold (EUR) | PFold (%) |
|---|---|---|---|---|---|
| 0001 | China | 50kV | 120000 | 100000 | 83,33 |
| 0002 | India | 50kV | 300000 | 200000 | 66,67 |
| 0003 | USA | 30kV | 280000 | 300000 | 107,14 |
| 0004 | China | 30kV | 270000 | 250000 | 92,59 |
| 0005 | China | 50kV | 300000 | 240000 | 80,00 |
| 0006 | China | 20kV | 300000 | 270000 | 90,00 |

FIG. 3

| Product Code | Country | Line Voltage (kV) | LP<sub>old</sub> (EUR) | LPCF | LP'<sub>old</sub> (EUR) | NP<sub>old</sub> (EUR) | PF<sub>old</sub> (%) |
|---|---|---|---|---|---|---|---|
| 0001 | China | 50kV | 120000 | 1,00 | 120000 | 100000 | 83,33 |
| 0002 | India | 50kV | 300000 | 1,00 | 300000 | 200000 | 66,67 |
| 0003 | USA | 30kV | 280000 | 1,00 | 280000 | 300000 | 107,14 |
| 0004 | China | 30kV | 270000 | 0,99 | 267300 | 250000 | 92,52 |
| 0005 | China | 50kV | 300000 | 1,01 | 303000 | 240000 | 79,20 |
| 0006 | China | 20kV | 300000 | 1,01 | 303000 | 270000 | 89,10 |

FIG. 3A

| Product Code | Country | Line Voltage (kv) | LP_old (EUR) | NP_old (EUR) | PF_old (%) |
|---|---|---|---|---|---|
| 0001 | China | 50kV | 120000 | 100000 | 83,33 |
| 0004 | China | 30kV | 270000 | 250000 | 92,59 |
| 0005 | China | 50kV | 300000 | 240000 | 80,00 |
| 0006 | China | 20kV | 300000 | 270000 | 90,00 |

DB1

COMPUTER-IMPLEMENTED METHOD FOR CALCULATING A REFERENCE SALES PRICE FOR A COMPLEX INDUSTRIAL PRODUCT TO BE MANUFACTURED AT INDUSTRIAL LEVEL

The present invention relates to a computer-implemented method for calculating a reference sales price for an industrial product, in particular a complex industrial product, to be manufactured at industrial level.

The method of the present invention is particularly suitable for being implemented in the context of the design activities of an industrial product to be manufactured, in particular once the industrial product to be manufactured has been configured according to the technical specifications provided by a client.

As is known, an important activity related to the design of an industrial product to be manufactured at industrial level consists in calculating a reference sales price for said industrial product, once this latter has been duly configured according to the technical specifications required by a client.

In general, this activity is particularly critical from an industrial point of view as it is prodromal to the formulation of the most appropriate quotation price for the client.

Another relevant aspect of such an activity consists in that it allows checking whether the design of the industrial product is the most appropriate from an industrial point of view.

As an example, if the calculated reference sales price for an industrial product is too high for a given market segment, the configuration, materials and/or components of the industrial product can be suitably modified to improve the industrialization process.

Nowadays, for complex industrial products (i.e. industrial products including a huge number of components), calculation methods still having an empirical character are typically adopted. Often, the accuracy of these calculation methods remarkably depends on the experience of the personnel carrying out said methods.

In the state of the art, it is quite felt the need for solutions allowing to carrying out the task of calculating a reference sales price for an industrial product, in particular for a complex industrial product, in a structured and repeatable manner without requiring that the staff dealing with such an activity has particular skills.

In order to respond to this need, the present invention provides a computer-implemented method for calculating a reference sales price for an industrial product to be manufactured, according to the following claim 1 and the related dependent claims.

In general, the calculation method, according to the invention, is carried out through a computerised system in communication with a first computerised station adapted to configure industrial products and with a second computerised station adapted to manage sales activities of industrial products.

In a general definition, the calculation method, according to the invention, comprises the following steps:

- a step, in which the computerised system receives, from said first computerised station, first data indicative of a virtual construction of the industrial product to be manufactured. Said first data include a first value indicative of a suggested sales price for the industrial product to be manufactured;
- a step, in which said computerised system receives, from said first computerised station, second data indicative of a virtual construction of at least a past industrial product similar to the industrial product to be manufactured. Said second data include at least a second value indicative of a suggested sale price calculated for said at least a past industrial product;
- a step, in which said computerised system receives, from said second computerised station, third data indicative of at least a sales order for said at least a past industrial product. Said third data include a third value indicative of a sales net price set for said at least a past industrial product;
- a step, in which said computerised system generates a database including one or more data-records set by selecting information included in said second and third data. Each data-record corresponds to a past industrial product and includes one or more first data-fields including technical information or sales information related to said past industrial product, a second data-field including the second value calculated for said past industrial product, a third data-field including the third value set for said past industrial product and a fourth data-field including a fourth value indicative of a price factor calculated for said past industrial product by said computerised system;
- a step, in which said computerised system selects a group of data-records of said database basing on information included in at least a first data-field of said data-records;
- a step, in which said computerised system calculates a fifth value indicative of a price correction index for the industrial product to be manufactured. Said fifth value is calculated as a weighted average of the fourth values included in the data-records included of said group of data-records selected from said database;
- a step, in which said computerised system calculates a sixth value indicative of a reference sales price for the industrial product to be manufactured. Said sixth value is calculated basing on said first value and on said fifth value related to the industrial product to be manufactured.

Preferably, said computerised system calculates said fourth value as a ratio between said third value and said second value, for each data-record included in said database.

According to a possible embodiment, the method of the invention comprises a step, in which the computerised system calculates a compensated second value for said at least a past industrial product.

Said compensated second value is calculated as a product between said second value and a compensation factor, which is set to take into account possible variations of the price lists for said at least a past industrial product.

According to this embodiment of the invention, each data-record of the above-mentioned database preferably comprises additional data-fields including the compensated second value calculated for the corresponding past industrial product and the related compensation factor. According to this embodiment of the invention, said computerised system calculates said fourth value as a ratio between said third value and said compensated second value, for each data-record included in said database.

Preferably, said computerised system calculates said sixth value as a product between said first value and said fifth value.

Preferably, said computerised system receives said first, second and third data by means of an Internet or local communication with said first computerised station and said second computerised station.

Preferably, said industrial product to be manufactured is an apparatus for electric power distribution applications.

In a further aspect, the present invention relates to a computer program, according to the following claim 9.

In a further aspect, the present invention relates to a computerised system, according to the following claim 10.

In a further aspect, the present invention relates to a computer-implemented method for designing an industrial product, according to the following claim 11 and the related dependent claims.

In general, the design method, according to the invention, is carried out through a computerised platform, which comprises the above-mentioned computerised system, the above-mentioned first computerised station in communication with said computerised system, and the above-mentioned second computerised station in communication with said computerised system.

In a general definition, the design method, according to the invention, comprises the following steps:
- a step, in which said first computerised station generates a virtual construction of the industrial product to be manufactured and provides first data indicative of said virtual construction;
- a step, in which said second computerised station provides second data indicative of a virtual construction of at least a past industrial product similar to said industrial product to be manufactured;
- a step, in which said second computerised station provides third data indicative of at least a sales order for said at least a past industrial product;
- a step, in which said computerised system carries out the above-mentioned calculation method, according to the invention.

Preferably, the design method, according to the invention, comprises a step, in which said computerised system checks whether a calculated sixth value indicative of a reference sales price for the industrial product to be manufactured is comprised within a predefined range of values.

Preferably, the design method, according to the invention, comprises a step of repeating the previous steps above. At said repetition cycle, said first computerised station generates a new virtual construction of the industrial product to be manufactured.

Figure 5:
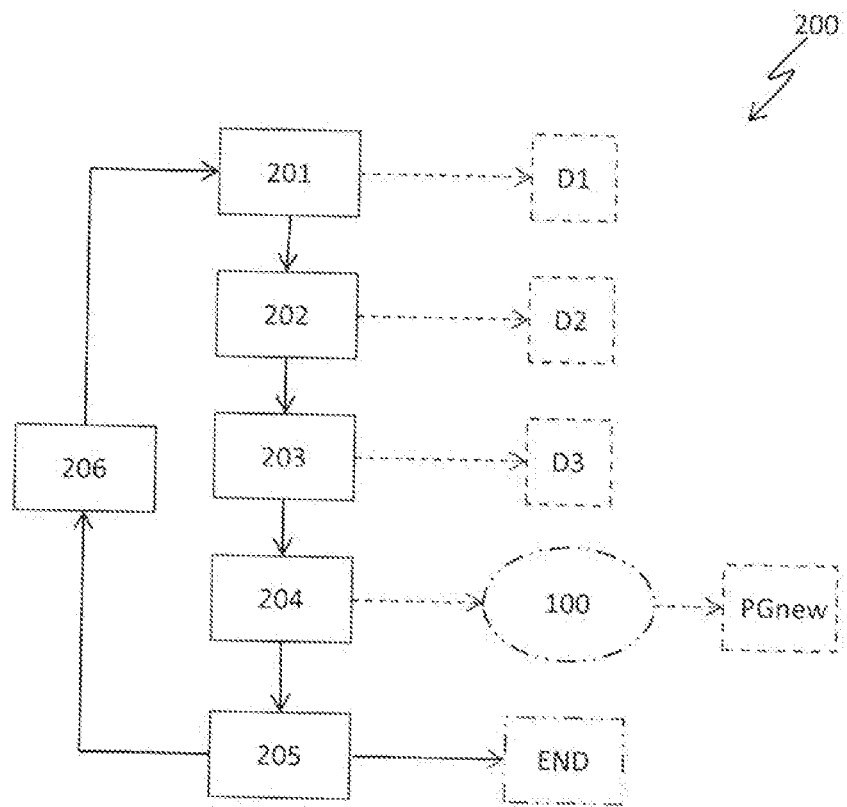

Further characteristics and advantages of the invention will emerge from the description of preferred, but not exclusive embodiments of the method, according to the invention, non-limiting examples of which are provided in the attached drawings, wherein:

FIG. 1 is schematic example showing a computerized platform for carrying out the calculation method and the design method, according to the invention is implemented;

FIGS. 2, 3, 3A, 4 schematically show the steps of the calculation method, according to the invention;

FIG. 5 schematically shows the steps of a design method, according to the invention.

With reference to the cited figures, an important aspect of the present invention relates to a computer-implemented method 100 for calculating a reference sales price for an industrial product to be manufactured at industrial level.

In principle, the above-mentioned industrial product may be any multi-component product that can be manufactured at industrial level. Anyway, the calculation method 100 is particularly dedicated to industrial products of complex type, i.e. having a huge number of components, e.g. up to some thousands.

Preferably, the above-mentioned industrial product is an apparatus for electric power distribution applications, for example a low-voltage or a medium-voltage switchgear.

In order to facilitate the understanding of the invention, the meaning of some terms used in describing the steps of the calculation method 100 is here specified in details for the sake clarity.

For the purpose of the present invention, the term "reference sales price" identifies a characteristic parameter of an industrial product to be used as a guidance for interacting with the client, e.g. for formulating a quotation price for said industrial product. Such a characteristic parameter is conveniently used also for checking the design of the industrial product as configured from an industrial point of view.

For the purpose of the present invention, the term "suggested sales price" identifies a further characteristic parameter of an industrial product, which is calculated during the configuration of this latter basing on the technical specification required by the client. In general, such a parameter is calculated basing on the cost of the components and/or materials forming the industrial product.

For the purpose of the present invention, the term "net sales price" identifies the actual price at which an industrial product is sold to a client, as specified in a corresponding sales order approved by the client.

For the purpose of the present invention, the term "price factor" identifies a price difference between the above-mentioned suggested sale price and the above-mentioned net sales price calculated for an industrial product.

The calculation method 100 is particularly suitable for being implemented in a computerised manner.

FIG. 1 shows a computerised platform D including a computerised system C, which may be of known type, for example, a server, a computer, a computerised station or the like.

Conveniently, the computerised system C includes data processing resources (e.g. one or more microprocessors) configured to execute software instructions to carry out the method 100, according to the invention.

The computerised system C may be arranged according to various control architectures, e.g. a centralized architecture, a multi-level architecture or even a cloud-computing architecture.

Conveniently, the computerised system C is capable of communicating via the Internet or at local level (e.g. via a LAN) with a first computerised station A adapted to design industrial products and with a second computerised station B adapted to manage sales activities (e.g. sales orders) related to industrial products.

In general, both the first computerised station A and the second computerised station B, which are part of the computerised platform D, may be of known type and they will be described in the following only in relation to the aspects relevant to the invention, for the sake of brevity.

According to some embodiments of the invention (not shown), the computerised system C may be integrated with the first computerised station A and/or with the second computerised station B to form a common computerised environment.

Figure 2:
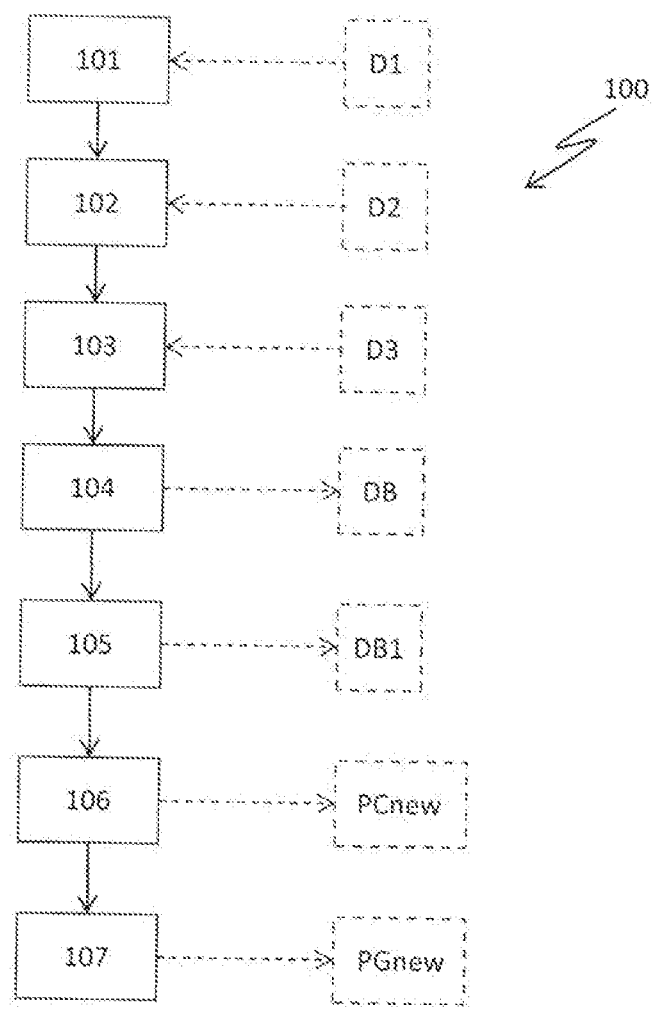
Figure 4:

The steps of the calculation method 100, according to the invention, will be now described in details with reference to FIGS. 2-4.

According to the invention, the calculation method 100 comprises a step 101, in which the computerised system C receives, from the first computerised station A, first data D1 indicative of a virtual construction (i.e. a computer-implemented configuration) of the industrial product to be manufactured.

The configuration process of the industrial product to be manufactured may be carried out through the first computerised station A in a known manner and it will be described in the following only in relation to the aspects relevant to the invention, for the sake of brevity. Preferably, the first computerised station A calculates the first data D1 during the configuration process of the industrial product to be manufactured basing on the technical specifications required by the client for said industrial product.

In general, the first data D1 include technical information related to the industrial product to be manufactured in accordance with the configuration designed through the first computerised station A.

Conveniently, the first data D1 include a first value $LP_{new}$ indicative of a suggested sales price for the industrial product to be manufactured.

Preferably, the first computerised station A calculates the first value $LP_{new}$ basing on data indicative of the cost of the components of the industrial product to be manufactured.

As an example, the first computerised station A may calculate the first value $LP_{new}$ basing on cost information retrieved from the so-called BOM (Bill of Materials).

According to the invention, the calculation method 100 comprises a step 102, in which the computerised system C receives, from the first computerised station A, second data D2 indicative of the virtual construction of one or more past industrial products similar to the industrial product to be manufactured.

A past industrial product similar to the industrial product to be manufactured is an industrial product of the same type of the industrial product to be manufactured, which has been previously designed through the first computerised station A.

As an example, if the industrial product to be manufactured is a switchgear, a similar past industrial product will be a switchgear of the similar type (i.e. with similar technical features) that has been previously designed (and sold) for the same client or another client.

Preferably, the second data D2 include, for each past industrial product, technical information related to said past industrial product in accordance with the configuration designed through the first computerised station A.

Conveniently, the second data D2 include, for each past industrial product, a second value $LP_{old}$ indicative of a suggested sales price for said past industrial product.

According to the invention, the method 100 comprises a step 103, in which the computerised system C receives, from the second computerised station B, third data D3 indicative of the sales orders for the above-mentioned one or more past industrial products.

In general, the third data D3 include commercial information and technical information related to each past industrial product.

Conveniently, the third data D3 include, for each past industrial product, a third value $NP_{old}$ indicative of a sales net price set for said past industrial product.

According to the invention, the calculation method 100 comprises a step 104, in which the computerised system C generates a database DB that includes one or more data-records DR, which are set by selecting information included in the above-mentioned second and third data D2, D3 (FIG. 3).

Each data-record DR of the database DB is referred to a corresponding past industrial product taken in consideration in the second and third data D2, D3 received by the computerised system C.

Each data-record DR of the database DB includes a plurality of data-fields, namely one or more first data-fields F1 including technical information or sales information related to the corresponding past industrial product, a second data-field F2 including the second value $LP_{old}$ calculated for the corresponding past industrial product, a third data-field F3 including the third value $NP_{old}$ set for the corresponding past industrial product and a fourth data-field F4 including a fourth value $PF_{old}$ indicative of a price factor calculated for the corresponding past industrial product.

The choice of the first data-fields F1 to be included in the database DB may be made automatically by the computerised system C basing on predetermined choice criteria. As an alternative, such a choice may be responsive to input information provided by the user through a suitable HMI (Human-Machine Interface) of the computerised system C.

In FIG. 3, a simplified example of the database DB, which may be generated by the computerised system C at the step 104 of the calculation method 100, is shown.

As it is possible to notice, in the example shown in FIG. 3, the database DB includes six different data-records DR, each referred to a corresponding past industrial product (for example a switchgear) and identified by a corresponding identification data-field including suitable identification information ("product code").

In the example shown in FIG. 3, each data-record DR includes two first data-fields F1. One of said first data-fields includes information about the sales country (sales information), in which the corresponding past industrial product has been sold. The other one of said first data-fields includes the indication of the operating voltage level provided for the corresponding past industrial product (technical information).

In the example shown in FIG. 3, each data-record DR includes a second data-field F2, a third data-field F3 and a fourth data-field F4 respectively including the above-mentioned second value $LP_{old}$, third value $NP_{old}$ and fourth value $PF_{old}$ for the past industrial product corresponding to said data-record.

Obviously, additional examples in which the database DB has a different composition of data-fields, in particular of the first-data field F1, may be easily conceived. In the practical implementation of the method of the invention, the database DB may have tens of first-data fields F1.

According to a preferred embodiment of the invention, the fourth value $PF_{old}$ included in the fourth data-field F4 of each data-record DR is calculated basing on the above-mentioned second value $LP_{old}$ and third value $NP_{old}$ included in the second and third data-fields F2, F3 of such a data-record.

In particular, for each data record DR, the fourth value $PF_{old}$ is preferably calculated according to the following relation:

$$PFold = \frac{NPold}{LPold} * 100$$

in other words as the (percentage) ratio between the corresponding third value $NP_{old}$ included in the third data-field F3 of said data-record and the second value $LP_{old}$ included in the second data-field F2 of said data-record.

As it may be understood from the above, the above-mentioned database DB forms a homogeneous source of information, from which all information needed to carry out the following steps of the calculation method 100 can be easily retrieved by properly selecting the data-records DR of interest.

This allows carry out the following steps of the calculation method 100 in an easier way with an improved accuracy and versatility.

According to the invention, the calculation method 100 comprises a step 105, in which the computerised system C selects a group DB1 of data-records DR of the database DB basing on information included in at least a first data-field F1 of each data-record of the database DB.

The choice of the first data-fields F1 to be used for selecting the group DB1 of data-records of the database DB may be made automatically by the computerised system C basing on predetermined choice criteria. As an alternative, such a choice may be responsive to input information provided by the user through a suitable HMI of the computerised system C.

In FIG. 4, a simplified example of a group DB1 of data-records selected from the exemplary database DB of FIG. 3, is shown. As it is possible to notice, the selected group DB1 of data-records includes four data-records, which have been selected basing on information included in the data-field F1 reporting the sales country ("China").

As it is easy to understand, the selection carried out at the step 105 of the calculation method 100 allows tailoring homogeneous and coherent information to be used for the calculation of the reference sales price for the industrial product to be manufactured.

Conveniently, such a selection activity is carried out according to selected technical or commercial criteria (in the example of FIG. 4, the Chinese market segment), in relation to which the reference sales price for the industrial product to be manufactured should be calculated.

This solution allows calculating the above-mentioned reference sales price for the industrial product to be manufactured in strong correlation with the selected criteria, thereby being in stronger relation with the actual industrial needs for which the industrial product is conceived.

According to the invention, the calculation method 100 comprises a step 106, in which the computerised system C calculates a fifth value $PF_{new}$ indicative of a price correction index for the industrial product to be manufactured.

In practice, the fifth value $PF_{new}$ basically consists of a correction parameter to be used for suitably correcting the first value $LP_{new}$ included in the first data D1 and finally obtaining a sixth value $PG_{new}$ indicative of a reference sales price for the industrial product to be manufactured.

According to the invention, the fifth value $PF_{new}$ indicative of a price correction index for the industrial product to be manufactured is calculated as a weighted average of the fourth values $PF_{old}$ included in the fourth data-fields F4 of the data-records included in the group DB1 of data-records selected from the database DB at the step 105 of the calculation method 100, according to the invention.

For a selected group of K data-records DR (K is a positive integer), the fifth value $PF_{new}$ may be calculated according to the following relation:

$$PFnew = \frac{\sum_{i=1}^{K} Pi * PFold_i}{\sum_{i=1}^{K} Pi}$$

where $PF_{old i}$ is the fourth value included in the fourth data-field F4 of the i-th data-record of the selected group DB1 of data-records and Pi is a corresponding weight value. Each weight value Pi may be conveniently selected depending on the above-mentioned second value $LP_{old}$ and third value $NP_{old}$, which are included in the second and third data-fields F2, F3 of the i-th data-record of the selected group DB1 of data-records.

It is important to notice that the correction parameter $PF_{new}$ is calculated basing on information related to past industrial products similar to the industrial product to be manufactured. This allows to properly taking account of the know-how progressively gathered in designing a certain typology of industrial products.

According to the invention, the calculation method 100 comprises a step 107, in which the computerised system C calculates a sixth value $PG_{new}$ indicative of a reference sales price for the industrial product to be manufactured.

Conveniently, the sixth value $PG_{new}$ is calculated basing on the first value $LP_{new}$ and on the fifth value $PF_{new}$ calculated for the industrial product to be manufactured.

Preferably, the sixth value $PG_{new}$ is calculated according to the following relation:

$$PGnew = LPnew * PFnew$$

in other words as the product of the first value $LP_{new}$ and the fifth value $PF_{new}$ calculated for the industrial product to be manufactured.

According to an embodiment of the invention, the computerised system C calculates a compensated second value $LP'_{old}$ for each past industrial product.

The compensated second value $LP'_{old}$ is conveniently calculated, for each past industrial product, according to the following relation:

$$LP'old = LPold * LPCF$$

namely as a product between the second value $LP_{old}$ and a compensation factor LPCF, which is set in such a way to take into account possible variations of the price lists for the one or more past industrial products.

According to such embodiment of the invention, each data-record DR of the database DB will conveniently comprise suitable additional data-fields $F_{ADD}$ including the compensated second value $LP'_{old}$ calculated for the corresponding past industrial product and the related compensation factor LPCF (FIG. 3A).

According to this embodiment of the invention, the fourth value $PF_{old}$ included in the fourth data-field F4 of each data-record DR is calculated basing on the above-mentioned compensated second value $LP'_{old}$ and third value $NP_{old}$.

In particular, for each data-record DR, the fourth value $PF_{old}$ is preferably calculated according to the following relation:

$$PFold = \frac{NPold}{LP'old} * 100$$

in other words as the (percentage) ratio between the corresponding third value $NP_{old}$ and the compensated second value $LP'_{old}$ included in said data-record.

As mentioned above, the calculated sixth value $PG_{new}$ is a characteristic parameter of the industrial product to be manufactured.

On one hand, such a characteristic parameter may be used for commercial purposes. As an example, it may be suitably tuned in order to formulate an appropriate quotation price for the industrial product to be manufactured.

As an example, a quotation price $QP_{new}$ for the industrial product to be manufactured may be calculated according to the following relation:

$$QPnew = PGnew * H$$

namely as a product between the sixth value $PG_{new}$ and a correction factor H (generally a number slightly lower or slightly higher than 1), which may be set to take into account the commercial policy to be adopted for the industrial product to be manufactured.

However, as it will clearly emerge from the following, such a characteristic parameter may be used for strictly technical purposes, namely for checking whether the industrial product to be manufactured has been properly configured through the first computerised station A.

An important aspect of the present invention, in fact, relates to a method 200 for designing an industrial product by means of a computerised platform (D), which includes the computerised system C, the first computerised station A in communication with said computerised system and the second computerised station B in communication with said computerised system.

The steps of the design method 200, according to the invention, will be now described in details with reference to FIG. 5.

According to the invention, the design method 200 comprises a step 201, in which the first computerised station A generates a virtual construction of the industrial product to be manufactured and provides first data D1 indicative of said virtual construction.

As mentioned above, the first computerised station A may carry out the configuration of the industrial product to be manufactured in a known manner, substantially basing on the technical specifications required by the client for said industrial product.

Conveniently, the configuration steps of the industrial product to be manufactured may be carried out responsive to input information provided by the user through a suitable HMI of the computerised station A.

According to the invention, the design method 200 comprises a step 202, in which the first computerised station A provides second data D2 indicative of a virtual construction of one or more a past industrial products similar to the industrial product to be manufactured.

In order to carry out this step, the first computerised station A advantageously selects and retrieves the second data D2 from a suitable memory. Also in this case, the selection process of the second data D2 may be responsive to input information provided by the user through a suitable HMI of the first computerised station A.

According to the invention, the design method 200 comprises a step 203, in which the second computerised station B provides third data D3 indicative of the sales order for the above-mentioned one or more past industrial products.

In order to carry out this step, the second computerised station B conveniently selects and retrieves the third data D3 from a suitable memory. The selection process of the third data D3 may be advantageously responsive to input information provided by the user through a suitable HMI of the second computerised station B.

According to the invention, the design method 200 comprises a step 204, in which the computerised system C carries out the calculation method 100, according to the invention, as described above.

In this way, the sixth value $PG_{new}$, which is characteristic of the industrial product to be manufactured as configured by the first computerised station A, is suitably calculated.

According to a preferred embodiment of the invention, the design method 200 provides for checking the industrial compatibility of the configuration selected for the industrial product to be manufactured. This allows identifying the most appropriate changes to the configuration selected for the industrial product to be manufactured, whenever necessary.

The design method 200 thus preferably comprises a step 205, in which the computerised system C checks whether the calculated sixth value $PG_{new}$ is comprised within a predefined range of values.

In order to carry out such a checking step, the computerised system C suitably compares the calculated sixth value $PG_{new}$ with one or more threshold values defining said predefined range of values.

If the calculated sixth value $PG_{new}$ falls within the above-mentioned predefined range of values, the configuration, according to which the industrial product to be manufactured has been designed through the first computerised station A, is determined as acceptable from an industrial point of view. The configuration of the industrial product to be manufactured does not need to be changed and the design method 200 is thus terminated.

If the calculated sixth value $PG_{new}$ does not fall within the above-mentioned predefined range of values, the configuration, according to which the industrial product to be manufactured has been designed, is determined as unacceptable from an industrial point of view. The configuration of the industrial product to be manufactured thus needs to be changed, at least partially.

The design method 200 thus preferably provides for a step 206 of repeating the previous steps 201-205. At such a repetition cycle, the first computerised station A generates a new virtual construction of the industrial product to be manufactured in such a way that this latter results configured in an acceptable from an industrial point of view.

In general, the design method 200 may include multiple repetition cycles, at which the configuration of the industrial product to be manufactured is changed from time to time, until resulting acceptable from an industrial point of view.

However, testing sessions of the design method 200 have shown that one or two repetition cycles are in most cases sufficient to suitably correct the configuration of the industrial product to be manufactured.

The calculation method 100 and the design method 200, according to the invention, provide relevant advantages with respect to known solutions of the state of the art.

The calculation method 100 allows calculating a reference sales price for an industrial product, even a complex industrial product, in an easy and repeatable manner.

The calculation method 100 is characterised by a remarkably accuracy as overlooking or oversight errors, which are typical of traditional empirical calculation methods of the state of the art, are remarkably reduced or minimized. In this way, even unexperienced personnel can thus carry out the calculation method 100 through the computerised system C.

By exploiting the calculation method 100 as a sort of "β-testing method", the design method 200, according to the invention, allows checking the industrial compatibility of a configuration designed for the industrial product to be manufactured in an objective and structure way, apart from the actual skill level of the personnel in charge.

The calculation method 100 and the design method 200, according to the present invention, are particularly adapted to be implemented by computerised supports without the need of specific hardware resources. They can thus be implemented in an easy and inexpensive way from an industrial point of view.

The invention claimed is:

1. A system for calculating a reference sales price for an industrial product, wherein the industrial product has multiple components, comprising:
a reference sales price system comprised of one or more microprocessors and one or more memory devices configured to execute software instructions, wherein the reference sales price system is in communication with a communication network;
a design station comprised of one or more microprocessors and one or more memory devices configured to execute software instructions and is in communication with the communication network, wherein the design station is configured to:
generate design data including a computer implemented virtual construction and a suggested sales price for a current industrial product;
identify a plurality of historical products which are similar to the current industrial product;
retrieve historical data corresponding to the plurality of historical industrial products, wherein the historical data for each historical industrial product includes a virtual construction of the historical industrial product and a suggested sales price of the historical industrial product, wherein each of the historical industrial products are similar to the current industrial product; and
transmit the design data and the historical data to the reference sales price system via the communication network;
a sales station comprised of one or more microprocessors and one or more memory devices configured to execute software instructions and is in communication with the communication network, wherein the sales station is configured to:
retrieve sales data corresponding to a plurality of historical sales orders for the historical industrial products, wherein the sales data for each historical sales order includes a sales net price corresponding with each of the plurality of historical industrial products; and
transmit the sales data to the reference sales price system via the communication network;
wherein the reference sales price system is configured to:
generate a database including a plurality of data records using the historical data and sales data, wherein each data record corresponds to a historical industrial product and includes:
a first data-field including technical and sales information obtained from the historical data and the sales data;
a second data-field including the suggested sales price of the historical industrial product;
a third data-field including the sales net price of the historical industrial product; and
a fourth data-field including a price factor;
select a group of data records based on the first data-field;
calculate a price correction index, wherein the price correction index is calculated as a weighted average of the fourth data-field of each of the data records in the group of data records;
calculate a reference sales price for the current industrial product based on the suggested sales price of the industrial product and the price correction index;
verify that the reference sales price falls within a predefined range of values;
if it is determined that the reference sales price falls outside the predetermined range, generate, at the design station, new design data including a new virtual construction and a new suggested sales price; and
repeat the preceding steps until the reference sales price falls within the predefined range of values.

2. The system, according to claim 1, wherein the reference sales price system calculates a compensated suggested sales price for the plurality of historical industrial products, the compensated suggested sales price being calculated as a product between the suggested sales price of the historical industrial product and a compensation factor, which is set to take into account possible variations of price lists for the plurality of historical industrial products.

3. The system, according to claim 2, wherein each data-record of the database comprises additional data-fields including the compensated suggested sales price and the compensation factor for the historical industrial product.

4. The system, according to claim 3, wherein the reference sales price system calculates the price factor as a ratio between the sales net price of the historical industrial product and the compensated suggested sales price of the historical industrial product, for each data-record included in said database.

5. The system, according to claim 4, wherein the reference sales price system generates a new virtual construction of the industrial product to be manufactured.

6. The system, according to claim 2, wherein the reference sales price system calculates the price factor as a ratio between the sales net price of the historical industrial product and said compensated suggested sales price, for each data-record included in the database.

7. The system, according to claim 6, wherein the reference sales price system calculates the reference sales price as a product between the suggested sales price of the industrial product and the price correction index.

8. The system, according to claim 2, wherein the reference sales price system calculates the reference sales price as a product between the suggested sales price of the industrial product and the price correction index.

9. The system, according to claim 2, wherein the reference sales price system the design data, historical data, and sales data by means of an Internet or local communication with the design station and the sales station.

10. The system, according to claim 2, wherein said industrial product to be manufactured is an apparatus for electric power distribution applications.

11. The system, according to claim 1, wherein the reference sales price system calculates the price factor as a ratio between the sales net price of the historical industrial product and the suggested sales price of the historical industrial product, for each data-record included in the database.

12. The system, according to claim 1, wherein the reference sales price system receives the design data, historical data, and sales data by means of an Internet or local communication with the design station and the sales station.

13. The system, according to claim 1, wherein the industrial product to be manufactured is an apparatus for electric power distribution applications.

14. The system, according to claim 1, wherein the reference sales price system checks whether the reference sales price for the industrial product to be manufactured is within a predefined range of values.

15. The system, according to claim 1, wherein the reference sales price system calculates the reference sales price as a product between the suggested sales price of the industrial product and the price correction index.

16. A method for designing an industrial product implemented on a reference sales price system, wherein the reference sales price system comprises a design station adapted to configure industrial products in communication with the reference sales price system via a communication network and a sales station adapted to manage sales activities of industrial products in communication with the reference sales price system via the communication network, wherein the method comprises the following steps:
 generating, at the design station, design data including a computer implemented virtual construction of the industrial product to be manufactured and a suggested sales price for the industrial product;
 identifying, at the design station, a plurality of historical products which are similar to the current industrial product;
 retrieving, at the design station, historical data including the plurality of historical industrial products, wherein the historical data for each historical industrial product includes a virtual construction of the historical industrial product and a suggested sales price of the historical industrial product, wherein each of the historical industrial products are similar to the industrial product;
 retrieving, at the sales station, sales data corresponding to a plurality of historical sales orders for the plurality of historical industrial products, wherein the sales data for each historical sales order includes a sales net price corresponding with each of the plurality of historical industrial products;
 receiving, at the reference sales price system, the design data, the historical data, and the sales data via the communication network;
 generating, at the reference sale price system, a database including a plurality of data records using the historical data and sales data, wherein each data record corresponds to a historical industrial product and includes:
 a first data-field including technical and sales information obtained from the historical data and the sales data;
 a second data-field including the suggested sales price of the historical industrial product;
 a third data-field including the sales net price of the historical industrial product; and
 a fourth data-field including a price factor;
 selecting, at the reference sales price system, a group of data records based on the first data-field;
 calculating, at the reference sales price system, a price correction index, wherein the price correction index is calculated as a weighted average of the fourth data-field of each of the data records in the group of data records;
 calculating, at the reference sales price system, a reference sales price for the industrial product based on the suggested sales price of the industrial product and the price correction index;
 verifying, at the reference sales price system, that the reference sales price falls within a predefined range of values;
 upon determining, at the reference sales price system, that the reference sales price falls outside the predetermined range, generate, at the design station, new design data including a new virtual construction and a new suggested sales price; and
 repeating the preceding steps until the reference sales price falls within the predefined range of values.

17. The method, according to claim 16, wherein the reference sales price system calculates a compensated suggested sales price for the plurality of historical industrial products, the compensated suggested sales price being calculated as a product between the suggested sales price of the historical industrial product and a compensation factor, which is set to take into account possible variations of price lists for the plurality of historical industrial products.

* * * * *